United States Patent [19]
Korkuch

[11] Patent Number: 5,205,778
[45] Date of Patent: Apr. 27, 1993

[54] APPARATUS FOR CHOPPING FISH FOR CHUM BAIT AND METHOD

[76] Inventor: William Korkuch, 116 Rte. 6A, Sandwich, Mass. 02563

[21] Appl. No.: 821,083

[22] Filed: Jan. 16, 1992

[51] Int. Cl.⁵ ............................................. A22C 25/18
[52] U.S. Cl. .................................... 452/155; 452/162
[58] Field of Search ............... 452/155, 149, 162, 171, 452/127, 141, 142

[56] References Cited

U.S. PATENT DOCUMENTS

| | | | |
|---|---|---|---|
| 2,241,648 | 5/1941 | Spang | 452/149 |
| 2,288,010 | 6/1942 | Meland | 452/149 |
| 2,291,809 | 8/1942 | Jackson | 452/149 |
| 4,817,245 | 4/1989 | Melville | 452/149 |
| 4,967,447 | 11/1990 | Romaine | 452/149 |

FOREIGN PATENT DOCUMENTS 1503726  8/1989  U.S.S.R. ............................. 452/149

*Primary Examiner*—Willis Little
*Attorney, Agent, or Firm*—Thomas A. Kahrl

[57] ABSTRACT

A portable cutting apparatus for cutting fish into chum bait, including a vertically aligned housing having a fish inlet and a chum bait outlet; a series of circular saw blades mounted on a common shaft rotatably mounted on the housing for chopping the fish into a plurality of chunks of chum; with feeding by gravity for feeding the fish to be chopped into chum bait into the fish inlet of the housing for chopping by the circular saw blades, and a manual drive attached to the shaft with a container for collecting the chunks of fish exiting the chum bait outlet; and method for cutting chum in chunks.

8 Claims, 2 Drawing Sheets

APPARATUS FOR CHOPPING FISH FOR CHUM BAIT AND METHOD

BACKGROUND OF THE INVENTION

The use of cut up chunks of fish, commonly termed chum, for use in fishing is important. Bait fish, typically chum bait fish such as herring, is customarily manually cut up into chunks either on a shore location or alternatively at sea on board a fishing vessel. Commonly a fisherman, using a sharp knife and a cutting board, cuts up bait fish such as herring into chunks, typically one and ¼ inches square, and drops the pieces in a container such as a barrel. The use of chum to attract fish, particularly with respect to commercial fishery normally involves a substantial quantity of chopped fish. While quantities vary, a full day of fishing normally will require 200 to 300 pounds of chopped fish, and when done by hand, cutting up chum normally requires about eight hours work by a crew member and consequently constitutes as a significant cost factor for a commercial fishing operator.

The slicing of fish into chum is a particularly hazardous operation as it involves the use of a sharp knife which frequently causes injury to the operator's hand. Furthermore, if chumming is done at sea where the fishing boat is subject to the rocking action of waves, the chumming operation becomes even more dangerous.

Chum is generally stored frozen and then thawed for slicing or used fresh. Furthermore, depending upon the type of fish encountered, it may be desirable to change the type of chum used to suit the taste of the fish being encountered while fishing, i.e., squid, menhaden or herring.

Prior art meat and fish cutting devices such as U.S. Pat. Nos. 4,733,437, 4,794,670 and 4,934,237, typically incorporate electrically powered cutting devices. Such cutting devices are suited for installations within buildings having a grounded or shielded electric power source/safety devices and stable mounting foundations. Furthermore, such electrically powered cutting devices substantially increase the hazard of cutting the operators hand and therefore are not suitable for either fish pier use where chumming often takes place, or alternatively at sea on board ship where chumming is done typically in the stern area of the fishing vessel.

A further aspect of chumming is that it is by nature messy, involving the production of debris such as fish blood, scales, etc. which is both messy for the operator and produces a mess in the work area as well, and requires substantial space in the work area for the cutting operation. Such operation requires clean up with a water rinse down, typically a salt water hose rinse down which is both inconvenient and time consuming, and requires a source of water either by hose or by swabbing.

Chumming by nature typically involves the cutting up a fresh bait fish such as herring having a length of 6 to 12 inches, with slicing making traverse cuts along the axis of the fish to produce chunks, preferably 1¼ square inch. Cutting of chum requires a motor driven cutting device.

It is therefore desirable to provide for a chum cutting device which is portable, economical, labor saving, versatile, can be used on ship board and ashore, lightweight and compact, easy to clean, manually operable, and rugged construction to withstand rough use at sea.

SUMMARY OF THE INVENTION

The invention relates to a portable cutting apparatus and method for chopping fish into chunks for chum bait. In particular, the invention concerns a portable, cutting apparatus for cutting fish into chum bait, having a housing including a plurality of walls enclosing a vertically aligned central duct having providing a central path in which path is arranged a plurality of circular saw blades, and includes a drive apparatus, typically a manually operated hand crank for driving the circular saw blades in a circular manner to cut fish introduced into the central duct.

The housing is constructed from non corrosive material, typically stainless steel to resist the rusting action of salt water and fish debris, has a fish inlet and a chum bait outlet and includes a front wall and a second side wall, and a first side wall and a second side wall forming a central duct for providing containment for fish passing downwardly through an interior path during the chum cutting operation. The two mounting walls of the housing include mounts for mounting the rotatable shaft of the circular saw blades in the central path in perpendicular relation to the longitudinal axis of the central duct.

The central duct is of rectangular configuration having a front wall and a back wall having a fixture extending outwardly to engage a base element, and includes clearing finger for guiding fish entering the fish inlet to stop chunks of chum which have not fallen through said duct to a container from continuing to rotation top of the circular saw blades, thereby clearing said blades and a series of separator block for forcing the fish against the outer peripheral cutting edges of circular saw blades. The central duct is vertically aligned providing a path for the fish passing from the fish inlet end to the chum bait outlet by gravity.

A plurality of grooves extend along the back wall spaced from and adjacent the tooth periphery of the circular saw blades and a base for mounting said housing in a manner such that the central axis of the path is in a vertical plane such that when fish are placed in the fish inlet of the housing adapted to receive the body of the fish parallel to the longitudinal axis of the housing and in orthogonical relation to the cutting apparatus, said fish is drawn into the central duct by the action of gravity aided by action of the cutting teeth arranged on the peripheral edge of the circular cutting saws.

The cutting apparatus typically consist of a series of circular saw blades mounted on a single rotatable shaft which is rotated by a drive means such as a hand crank or a power drive, the circular saw blades arranged in perpendicular relation to the longitudinal axis of the central duct and each of said saw blades are positioned to extend into the groove provided between adjacent separator blocks so that the fish is forced against said blocks being cut into chunks as the saw blades are rotated, and to be arranged in a path in the central duct for engaging fish passing from the fish inlet end to the chum bait outlet.

The circular saw blades are adapted for chopping the fish into a plurality of chunks and include a plurality of circular saw blades mounted on a rotatable shaft and arranged within the central duct, with feeding of the fish to be chopped into chum bait accomplished by dropping fish into the fish inlet of the housing by gravity feed with augmentation by circular saw blade chopper teeth acting to draw fish into engagement with the multiple circular saw blades mounted in the chopping path in the housing. A safety gravity feed hopper device is provided at the inlet end to protect the fingers of an operator.

A manually operated crank is provided for driving the chopping means in a circular path for engaging the fish fed by manual operation into the housing. A container is provided for collecting the chunks of fish exiting the chum bait outlet.

The invention, while disclosing a device for cutting fish, may be used for other meat cutting operations involving powered drive apparatus and for cutting meat other than fish as can be appreciated by one skilled in the cutting art.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DETAILED DESCRIPTION OF THE PREFERRED EMBODIMENT

Figure 1:
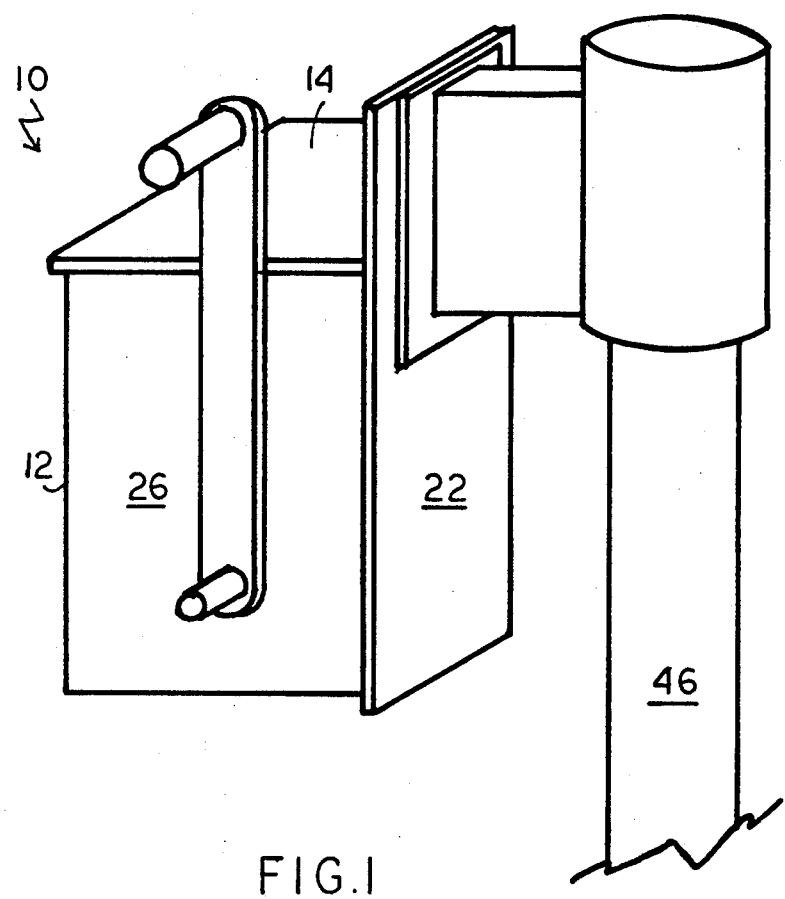
FIG. 1 is a side elevational view of the apparatus for chopping fish embodying the present invention shown in the mounted position.
Figure 2:
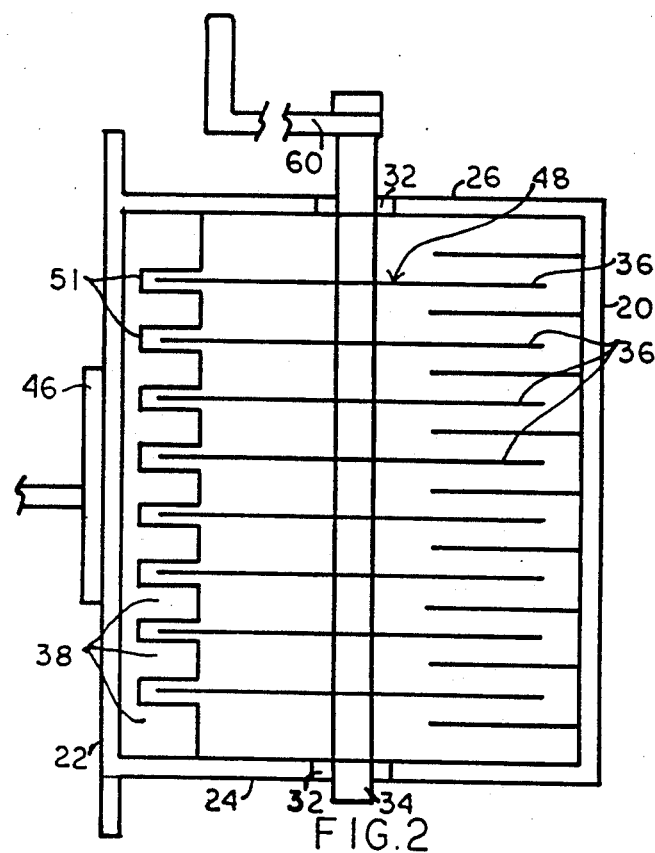
FIG. 2 is a top plan view of FIG. 1 showing the series of circular saw blades mounted in the housing.

With reference to the drawings, there is shown a portable manually operated cutting apparatus 10 having a housing 12 having a fish inlet 14 for receiving fish for chopping and a chum bait outlet 16 for deposit of chopped chunks in a container 17. The housing 12 includes a front wall 20 and a back wall 22, and a first side wall 24 and a second side wall 26 for providing a central duct 28 for fish passing downwardly through a central path 30 within the central duct during the cutting operation.

The two side walls 26 of the housing 12 include mounts 32 for mounting a saw blade rotatable shaft 34 of having a series of circular saw blades 36 mounted thereon.

A plurality of separator blocks 38 for forcing the fish against the circular saw blades 36 extend inwardly into the central duct from the back wall 22 with a series of grooves 40 extend along the back wall 22 spaced from and adjacent a toothed peripheral edge 42 of each of the circular saw blades 36. A series of clearing fingers 44 for clearing fish chunks extend inwardly into the central duct from the front wall 20.

A base 46 is provided for mounting housing 12 whereby the central axis is in a vertical plane. When fish placed in the fish inlet 14 said fish are drawn into the central duct 28 by the action of gravity and the cutting edge 42. A series 48 of circular saw blades 36 positioned in generally parallel and spaced apart relationship, each said saw blade having a toothed peripheral edge 50 including a having a saw segment 52 and a tooth 54 segment as shown in FIG. 3, said series 48 mounted on rotatable shaft 34 and the shaft arranged and mounted on said mounts within the housing 12 spaced from and adjacent a plurality of grooves 51 extending inwardly from the back wall 26.

Figure 3:
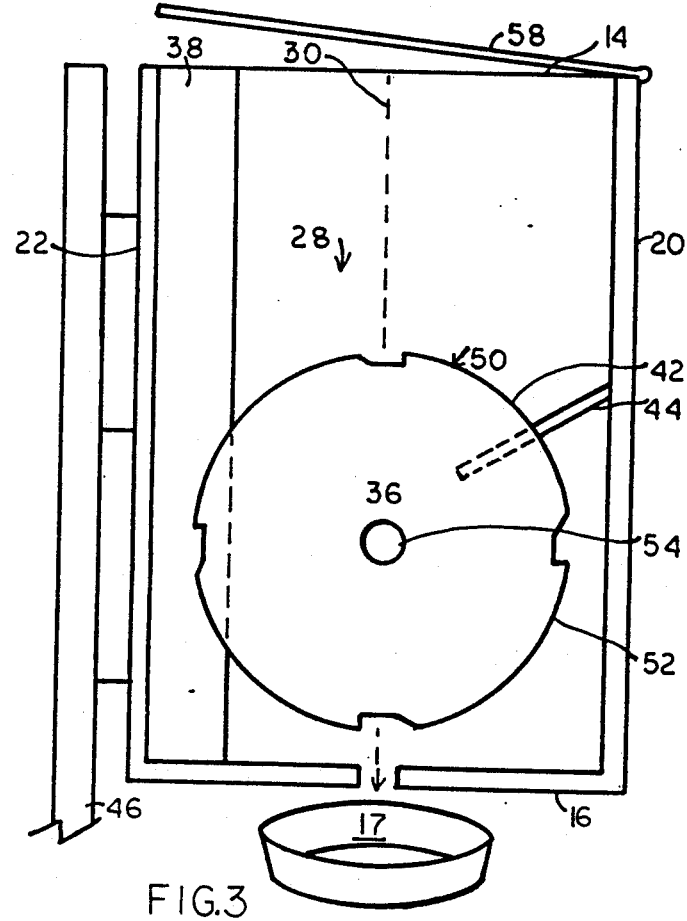
FIG. 3 is a cross sectional elevation taken along line 3—3 of FIG. 2 of the invention shown in FIG. 1.

Fish being chopped follow a path 56 shown in FIG. 3 by gravity feed with augmentation by the toothed peripheral edge of the circular saw blade. A safety gravity feed hopper 58 is provided on the top of the fish inlet for guarding the operator's fingers from the series of blades, and a manually operated hand crank 60 is connected to one end of shaft.

What is claimed is:

1. A portable cutting apparatus configured for low speed operation adapted for use in a fishing vessel while underway for cutting fish into chum bait, which apparatus comprises
   a) a housing having a fish inlet and a chum bait outlet and a central duct defining a path for cutting fish, wherein the housing includes a base for mounting said housing such that the central axis of the path is in a vertical plane such that fish placed in the fish inlet are drawn into the duct for cutting by the action of gravity;
   b) base means for mounting the housing in a vertical plane with the path in a vertical plane;
   c) a chopping means including a rotatable shaft rotatably mounted in the housing for chopping the fish into a plurality of chunks of chum bait comprising a plurality of generally parallel, spaced apart circular saw blades having a toothed periphery mounted on a rotatable shaft and arranged within the central duct;
   d) feed means for feeding the fish to be chopped into chum bait into the fish inlet of the housing for chopping by the chopping means, wherein the feed means for feeding the fish to be chopped into chum bait is gravity feed augmented by the toothed periphery of the circular saw blade acting to draw fish into engagement with the multiple circular saw blades mounted in the path in the housing;
   e) drive means for driving the chopping means at low cutting speed in a circular path for engaging the fish fed into the housing, comprising a manually operated hand crank rigidly connected to the one end of the rotatable shaft configured to stop upon release of the hand crank;
   f) container means for collecting the chunks of chum bait exiting the chum bait outlet, and
   g) safety means for protecting the operators hands from being cut while feeding fish into the inlet of the housing; whereby a fish positioned in the fish inlet above and in contact with the chopping means can be cut into chunks by manual force applied to the hand crank rigidly connected to the chopping means directed to turning the circular saw blades acting to draw the fish into contact with the circular saw blades for cutting the fish for deposit in a container.

2. The portable cutting apparatus of claim 1, wherein the housing includes a central duct vertically aligned providing a path for the fish passing from the fish inlet end to the chum bait outlet.

3. The portable cutting apparatus of claim 1 wherein the central duct is of rectangular configuration having a front wall and an other side wall and includes finger means for guiding fish entering the fish inlet and a separator block means for forcing the fish against the circular saw blades.

4. The portable cutting apparatus of claim 1 wherein the housing includes a base for mounting said housing such that the central axis of the path is in a vertical plane such that fish placed in the fish inlet are drawn into the duct by the action of gravity aided by action of said circular saw blades.

5. The portable cutting apparatus of claim 1 wherein a plurality of grooves extend along the back of the wall, each space extending between adjacent separator blocks, said grooves spaced from and adjacent the toothed periphery of the circular saw blades.

6. The portable cutting apparatus of claim 1 wherein the two mounting walls of the housing include mounts for mounting the rotatable shaft of the chopping means in the central path in perpendicular relation to the circular saw rotatable shaft.

7. The portable cutting apparatus of claim 1 wherein the safety means for protecting the operator's hands includes a safety lid positioned at the fish inlet.

8. The portable cutting apparatus of claim 1 wherein the bracket means is mounted on a vertically extending post.

* * * * *